United States Patent
Hamamoto et al.

(10) Patent No.: US 10,018,401 B2
(45) Date of Patent: Jul. 10, 2018

(54) VEHICLE HEAT PUMP WITH DEFROSTING MODE

(71) Applicants: JAPAN CLIMATE SYSTEMS CORPORATION, Hiroshima (JP); Panasonic Corporation, Osaka (JP)

(72) Inventors: Hiroshi Hamamoto, Hiroshima (JP); Kohei Fukawatase, Hiroshima (JP); Yoshihiko Otake, Hiroshima (JP); Kou Komori, Nara (JP); Subaru Matsumoto, Tochigi (JP); Norihiro Miyamura, Hyogo (JP)

(73) Assignees: JAPAN CLIMATE SYSTEMS CORPORATION, Hiroshima (JP); PANASONIC CORPORATION, Osaka (JP)

( * ) Notice: Subject to any disclaimer, the term of this patent is extended or adjusted under 35 U.S.C. 154(b) by 264 days.

(21) Appl. No.: 15/018,119

(22) Filed: Feb. 8, 2016

(65) Prior Publication Data

US 2016/0153697 A1 Jun. 2, 2016

Related U.S. Application Data

(63) Continuation of application No. PCT/JP2014/004110, filed on Aug. 6, 2014.

(30) Foreign Application Priority Data

Aug. 9, 2013 (JP) .................... 2013-166122

(51) Int. Cl.
*B60H 1/22* (2006.01)
*F25D 21/12* (2006.01)
(Continued)

(52) U.S. Cl.
CPC ....... *F25D 21/125* (2013.01); *B60H 1/00328* (2013.01); *B60H 1/00785* (2013.01);
(Continued)

(58) Field of Classification Search
CPC ............... B60H 1/00785; B60H 1/321; F25B 2313/02322; F25B 2347/00;
(Continued)

(56) References Cited

U.S. PATENT DOCUMENTS

| 5,704,217 A | 1/1998 | Itoh et al. |
| 6,293,123 B1 * | 9/2001 | Iritani .................. B60H 1/3205 62/197 |
| 2010/0326127 A1 * | 12/2010 | Oomura ............. B60H 1/00785 62/498 |

FOREIGN PATENT DOCUMENTS

| JP | 64-003478 A | 1/1989 |
| JP | 04-278153 A | 10/1992 |

(Continued)

OTHER PUBLICATIONS

International Search Report for corresponding International Application No. PCT/JP2014/004110 dated Nov. 11, 2014.
(Continued)

*Primary Examiner* — Jonathan Bradford
(74) *Attorney, Agent, or Firm* — Renner, Otto, Boisselle & Sklar, LLP

(57) ABSTRACT

If an exterior heat exchanger is sensed to be frosted while a heat pump device is operating in a first heating operation mode in which two interior heat exchangers are used, the operation modes are switched into a second heating operation mode in which one interior heat exchanger is used, and then switched into a defrosting operation mode.

14 Claims, 11 Drawing Sheets

(51) Int. Cl.
  *B60H 1/32* (2006.01)
  *B60H 1/00* (2006.01)
  *F25B 13/00* (2006.01)
  *F25D 21/00* (2006.01)
  *F25D 21/02* (2006.01)
  *F25B 6/04* (2006.01)
  *F25B 47/02* (2006.01)
  *F25B 5/04* (2006.01)
  *F25B 41/04* (2006.01)

(52) U.S. Cl.
  CPC ......... *B60H 1/00921* (2013.01); *B60H 1/321* (2013.01); *F25B 5/04* (2013.01); *F25B 6/04* (2013.01); *F25B 13/00* (2013.01); *F25B 41/04* (2013.01); *F25B 47/022* (2013.01); *F25D 21/004* (2013.01); *F25D 21/02* (2013.01); *F25B 2313/02322* (2013.01); *F25B 2341/0662* (2013.01); *F25B 2347/02* (2013.01); *F25B 2347/023* (2013.01); *F25B 2400/0409* (2013.01); *F25B 2400/0411* (2013.01)

(58) Field of Classification Search
  CPC ............ F25B 2347/02; F25B 2347/021; F25B 2347/023; F25B 2700/11
  See application file for complete search history.

(56) References Cited

FOREIGN PATENT DOCUMENTS

| | | |
|---|---|---|
| JP | 8-327194 A | 12/1996 |
| JP | 9-142139 A | 6/1997 |
| JP | 2004-182109 A | 7/2004 |
| JP | 2010-111222 A | 5/2010 |
| JP | 2010-236709 A | 10/2010 |
| JP | 2011-20477 | 2/2011 |

OTHER PUBLICATIONS

Form PCT/ISA/237 for corresponding International Application No. PCT/JP2014/004110 dated Nov. 11, 2014.

\* cited by examiner

COOLING OPERATION MODE

FIRST HEATING OPERATION MODE

SECOND HEATING OPERATION MODE

VEHICLE HEAT PUMP WITH DEFROSTING MODE

CROSS-REFERENCE TO RELATED APPLICATION

This is a continuation of International Application No. PCT/JP2014/004110 filed on Aug. 6, 2014, which claims priority to Japanese Patent Application No. 2013-166122 filed on Aug. 9, 2013. The entire disclosures of these applications are hereby incorporated by reference.

BACKGROUND

The present disclosure relates to a vehicle air conditioner to be mounted on a vehicle, and more particularly relates to a vehicle air conditioner including a heat pump device.

The waste heat of an internal combustion engine has been used in the art as a heating heat source for a vehicle air conditioner. Recently, however, electric cars equipped with no internal combustion engines and plug-in hybrid cars equipped with an internal combustion engine to be run for just a short period of time have become more and more popular. Thus, it has become an increasingly urgent task to determine how to provide comfortable air-conditioning in those kinds of vehicles.

Japanese Unexamined Patent Publication No. 2004-182109 discloses, as a vehicle air conditioner, a heat pump device including a motor-driven compressor. This heat pump device includes not only the motor-driven compressor but also an exterior heat exchanger arranged outside a vehicle cabin, an expansion valve, an upstream interior heat exchanger arranged upstream in an air-conditioning air flow direction inside the vehicle cabin, and a downstream interior heat exchanger arranged downstream in the air-conditioning air flow direction inside the vehicle cabin. The heat pump device is formed by connecting these members together via refrigerant piping.

During heating, the refrigerant flow paths are determined such that a high-temperature, high-pressure refrigerant discharged from the motor-driven compressor flows through the upstream and downstream interior heat exchangers. Thus, the air-conditioning air is heated in two stages.

According to Japanese Unexamined Patent Publication No. 2004-182109, the air-conditioning air may be heated in two stages by the upstream and downstream interior heat exchangers during heating, thus achieving a high heating capacity.

In general, while the heat pump device is performing a heating mode of operation, the exterior heat exchanger may be frosted (i.e., frost may be formed there). Once frost has been formed there, the frost needs to be removed as soon as possible in order to avoid affecting the occupant's comfortableness.

However, Japanese Unexamined Patent Publication No. 2004-182109 fails to disclose any specific configuration for switching the operation modes from the heating operation mode into the defrosting operation mode.

In view of the foregoing background, it is therefore an object of the present disclosure to increase the occupant's comfortableness by defrosting the exterior heat exchanger early and reliably if the exterior heat exchanger is frosted when the air-conditioning air may be heated by using a plurality of interior heat exchangers during a heating mode of operation.

SUMMARY

To achieve this object, according to the present disclosure, if any frosting is detected while a heating mode of operation is being performed by first and second interior heat exchangers, a defrosting mode of operation is started after a heating mode of operation has been performed by one of the two interior heat exchangers.

A first aspect of the present disclosure is a vehicle air conditioner comprising:

a heat pump device including a compressor which compresses a refrigerant, a first interior heat exchanger provided inside a vehicle cabin, a second interior heat exchanger provided upstream of the first interior heat exchanger in an airflow direction inside the vehicle cabin, an exterior heat exchanger provided outside the vehicle cabin, and an expansion valve, the heat pump device being formed by connecting together the compressor, the first and second interior heat exchangers, the expansion valve, and the exterior heat exchanger via refrigerant piping;

an interior air-conditioning unit which houses the first and second interior heat exchangers, which includes a blower that blows air-conditioning air toward the first and second interior heat exchangers, and which is configured to produce air-conditioned air and supply the air-conditioned air into the vehicle cabin;

a frosting state detecting means for detecting a frosting state of the exterior heat exchanger; and an air-conditioning controller which controls the heat pump device and the interior air-conditioning unit.

In this vehicle air conditioner, the heat pump device is switched by the air-conditioning controller into any of a plurality of operation modes including: a first heating operation mode in which a refrigerant discharged from the compressor is allowed to flow through the first and second interior heat exchangers without being expanded by the expansion valve; a second heating operation mode in which the refrigerant discharged from the compressor is allowed to flow through either the first interior heat exchanger or the second interior heat exchanger without being expanded by the expansion valve; and a defrosting operation mode in which the refrigerant discharged from the compressor is allowed to flow through the exterior heat exchanger without being expanded by the expansion valve, and the air-conditioning controller is configured to switch the operation modes of the heat pump device into the second heating operation mode and then into the defrosting operation mode if the frosting state detecting means has sensed, while the operation mode of the heat pump device is the first heating operation mode, that the exterior heat exchanger is frosted.

According to this configuration, in the first heating operation mode, the refrigerant discharged from the compressor is allowed to flow through the first and second interior heat exchangers without being expanded, thus achieving a high heating capacity. If the exterior heat exchanger is frosted, a second heating mode of operation is performed such that the refrigerant flows through one of the first and second interior heat exchangers. As a result, in the second heating operation mode, the pressure and temperature of the refrigerant discharged from the compressor increase by a decrease in the heat transfer area of the heat exchanger functioning as a radiator compared to the first heating operation mode. In general, the compressor is formed out of a metallic member. Thus, if the temperature of the discharged refrigerant rises, then heat is accumulated in the compressor itself having a large heat capacity. Therefore, during the defrosting mode of operation, a high-temperature refrigerant may be supplied to the exterior heat exchanger thanks to the multiplier effect achieved by the quantity of heat stored in the compressor and the temperature of the discharged refrigerant that has risen from the temperature during the first heating mode of operation. This thus allows for defrosting the exterior heat exchanger early and reliably.

A second aspect of the present disclosure is an embodiment of the first aspect of the present disclosure. In the second aspect, the air-conditioning controller is configured to switch the operation modes of the heat pump device into the second heating operation mode if the frosting state detecting means has sensed that a first amount of frost has been formed on the exterior heat exchanger, and to switch the operation modes of the heat pump device into the defrosting operation mode if the frosting state detecting means has sensed thereafter that a second amount of frost that is larger than the first amount has been formed on the exterior heat exchanger.

According to this configuration, the operation modes are switched into the second heating operation mode to raise the temperature of the refrigerant when the amount of frost formed is still relatively small, and then switched into the defrosting operation mode when the amount of frost formed increases after that, thus allowing for defrosting the exterior heat exchanger early and reliably.

A third aspect of the present disclosure is an embodiment of the first or second aspect of the present disclosure. In the third aspect, the vehicle air conditioner comprises a refrigerant state detecting means for detecting a state of the refrigerant discharged from the compressor, and the air-conditioning controller is configured to switch the operation modes of the heat pump device from the second heating operation mode into the defrosting operation mode when the refrigerant state detecting means senses that either the temperature or pressure of the refrigerant discharged from the compressor has become equal to or greater than a predetermined value.

According to this configuration, the operation modes are switched into the defrosting operation mode when the refrigerant discharged from the compressor turns into a state suitable for the defrosting mode of operation. This thus allows for defrosting the exterior heat exchanger reliably.

A fourth aspect of the present disclosure is an embodiment of any one of the first to third aspects of the present disclosure. In the fourth aspect, the expansion valve is arranged closer to a refrigerant inlet of the exterior heat exchanger and controlled by the air-conditioning controller, and the air-conditioning controller is configured to switch the operation modes of the heat pump device from the second heating operation mode into the defrosting operation mode by controlling the expansion valve in an opening direction.

According to this configuration, the operation modes may be switched from the heating operation mode into the defrosting operation mode by controlling the expansion valve in an opening direction. This thus allows for defrosting the exterior heat exchanger reliably by making a high-temperature refrigerant flow through the exterior heat exchanger as intended with the heat loss cut down compared to changing piping routes.

A fifth aspect of the present disclosure is an embodiment of any one of the first to fourth aspects of the present disclosure. In the fifth aspect, the frosting state detecting means detects frosting based on the temperature of the refrigerant at the refrigerant inlet of the exterior heat exchanger.

According to this configuration, the frosting state of the exterior heat exchanger may be detected accurately, thus allowing for performing a defrosting mode of operation at an appropriate timing.

A sixth aspect of the present disclosure is an embodiment of any one of the first to fifth aspects of the present disclosure. In the sixth aspect, the air-conditioning controller switches the operation modes of the heat pump device from the first heating operation mode into the second heating operation mode, and then sets a discharge rate per unit time of the refrigerant from the compressor to be higher than its setting before the switch of the operation modes.

This configuration allows for increasing the pressure and temperature of the discharged refrigerant while avoiding a decline in the heating capacity in the second heating operation mode.

A seventh aspect of the present disclosure is an embodiment of any one of the first to sixth aspects of the present disclosure. In the seventh aspect, the air-conditioning controller switches the operation modes of the heat pump device from the first heating operation mode into the second heating operation mode, and then sets the airflow rate of the blower to be lower than its setting before the switch of the operation modes.

This configuration allows for increasing the pressure and temperature of the discharged refrigerant while avoiding a decrease in blowout temperature in the second heating operation mode.

An eighth aspect of the present disclosure is an embodiment of any one of the first to seventh aspects of the present disclosure. In the eighth aspect, the vehicle air conditioner comprises an electric heater to heat the air-conditioning air, the electric heater is controlled by the air-conditioning controller, and the air-conditioning controller activates the electric heater if a required blowout air temperature is not reached yet even after the operation modes of the heat pump device have been switched from the first heating operation mode into the second heating operation mode.

This configuration allows for increasing the temperature of the refrigerant discharged from the compressor while minimizing a decrease in blowout air temperature in the second heating operation mode.

A ninth aspect of the present disclosure is an embodiment of any one of the first to eighth aspects of the present disclosure. In the ninth aspect, the air-conditioning controller switches the operation modes of the heat pump device from the second heating operation mode into the defrosting operation mode, and then sets a discharge rate per unit time of the refrigerant from the compressor to be higher than its setting before the switch of the operation modes.

This configuration allows a high-temperature refrigerant to flow through the exterior heat exchanger by raising the temperature of the refrigerant discharged from the compressor.

A tenth aspect of the present disclosure is an embodiment of any one of the first to eighth aspects of the present disclosure. In the tenth aspect, the air-conditioning controller switches the operation modes of the heat pump device into the first heating operation mode after defrosting is done in the defrosting operation mode.

This configuration enables a high-efficiency heating operation.

An eleventh aspect of the present disclosure is an embodiment of any one of the first to tenth aspects of the present disclosure. In the eleventh aspect, the air-conditioning controller switches the operation modes of the heat pump device into the second heating operation mode and then into the first heating operation mode after defrosting is done in the defrosting operation mode.

According to this configuration, by switching the operation modes into the second heating operation mode after defrosting is done, the blowout temperature may be raised quickly by increasing the higher pressure of the refrigerant early. Then, by switching the operation modes into the first heating operation mode early, a high-efficiency heating operation is enabled.

A twelfth aspect of the present disclosure is an embodiment of the eleventh aspect of the present disclosure. In the twelfth aspect, the air-conditioning controller switches the operation modes of the heat pump device from the second heating operation mode into the first heating operation mode based on the pressure of the refrigerant.

This configuration allows for switching the operation modes from the second heating operation mode into the first heating operation mode at an appropriate timing based on the pressure of the refrigerant.

A thirteenth aspect of the present disclosure is an embodiment of the eleventh aspect of the present disclosure. In the thirteenth aspect, the air-conditioning controller switches the operation modes of the heat pump device from the second heating operation mode into the first heating operation mode based on a blowout air temperature.

This configuration allows for switching the operation modes from the second heating operation mode into the first heating operation mode at an appropriate timing based on the blowout air temperature.

A fourteenth aspect of the present disclosure is an embodiment of the eleventh aspect of the present disclosure. In the fourteenth aspect, the air-conditioning controller switches the operation modes of the heat pump device into the first heating operation mode when a predetermined amount of time passes since the operation modes were switched into the second heating operation mode.

According to this configuration, the operation modes may be switched into the first heating operation mode at an appropriate timing based on the amount of time elapsed.

A fifteenth aspect of the present disclosure is a vehicle air conditioner comprising:

a heat pump device including a compressor which compresses a refrigerant, a first interior heat exchanger provided inside a vehicle cabin, a second interior heat exchanger provided upstream of the first interior heat exchanger in an airflow direction inside the vehicle cabin, an exterior heat exchanger provided outside the vehicle cabin, and an expansion valve, the heat pump device being formed by connecting together the compressor, the first and second interior heat exchangers, the expansion valve, and the exterior heat exchanger via refrigerant piping;

an interior air-conditioning unit which houses the first and second interior heat exchangers, which includes a blower that blows air-conditioning air toward the first and second interior heat exchangers, and a door that adjusts the flow rate of the air-conditioning air passing through the first and second interior heat exchangers, and which is configured to produce air-conditioned air and supply the air-conditioned air into the vehicle cabin;

a frosting state detecting means for detecting a frosting state of the exterior heat exchanger; and an air-conditioning controller which controls the heat pump device and the interior air-conditioning unit, wherein the vehicle air conditioner is switched by the air-conditioning controller into any of a plurality of operation modes including: a first heating operation mode in which a refrigerant discharged from the compressor is allowed to flow through the first and second interior heat exchangers without being expanded by the expansion valve; a third heating operation mode in which the refrigerant discharged from the compressor is allowed to flow through the first and second interior heat exchangers without being expanded by the expansion valve with the flow rate of the air passing through one of the first and second interior heat exchangers decreased by the door; and a defrosting operation mode in which the refrigerant discharged from the compressor is allowed to flow through the exterior heat exchanger without being expanded by the expansion valve, and the air-conditioning controller is configured to switch the operation modes into the third heating operation mode and then into the defrosting operation mode if the frosting state detecting means has sensed, while the operation mode is the first heating operation mode, that the exterior heat exchanger is frosted.

According to this configuration, during the first heating operation mode, the refrigerant discharged from the compressor is allowed to flow through the first and second interior heat exchangers without being expanded, thus achieving a high heating capacity. If the exterior heat exchanger is frosted, the flow rate of the air-conditioning air passing through one of the first and second interior heat exchangers is decreased as the third heating operation mode. This decreases the quantity of heat dissipated compared to during the first heating operation mode, thus raising the temperature of the refrigerant discharged from the compressor. In addition, the temperature of the compressor itself rises, thus allowing the compressor to perform a heat storage function. Furthermore, by switching the operation modes into the defrosting operation mode, a high-temperature refrigerant flows through the exterior heat exchanger, thus allowing for defrosting the exterior heat exchanger early and reliably.

According to the first aspect of the present disclosure, if frosting is detected while a first heating mode of operation is being performed by the first and second interior heat exchangers, the operation modes are switched into a second heating operation mode in which the refrigerant is allowed to flow through one of the two interior heat exchangers and then switched into a defrosting operation mode. This thus allows for defrosting the exterior heat exchanger early and reliably.

According to the second aspect of the present disclosure, the operation modes are switched according to the amount of frost formed, thus allowing for defrosting the exterior heat exchanger even more reliably.

According to the third aspect of the present disclosure, the operation modes are switched into the defrosting operation mode when the temperature or pressure of the refrigerant discharged from the compressor becomes equal to or greater than a predetermined value, thus allowing for defrosting the exterior heat exchanger reliably.

According to the fourth aspect of the present disclosure, the operation modes are switched from the second heating operation mode into the defrosting operation mode by controlling the expansion valve in an opening direction. This thus allows for defrosting the exterior heat exchanger reliably with the heat loss cut down.

According to the fifth aspect of the present disclosure, frosting is detected based on the temperature of the refrigerant at the refrigerant inlet of the exterior heat exchanger, thus allowing for performing a defrosting mode of operation at an appropriate timing.

According to the sixth aspect of the present disclosure, after the operation modes have been switched from the first heating operation mode into the second heating operation mode, the refrigerant discharge rate of the compressor is increased, thus allowing for defrosting the exterior heat exchanger reliably by raising the pressure and temperature of the discharged refrigerant while keeping the occupant comfortable enough with a decrease in blowout temperature minimized.

According to the seventh aspect of the present disclosure, after the operation modes have been switched from the first heating operation mode into the second heating operation mode, the airflow rate is decreased, thus allowing for defrosting the exterior heat exchanger reliably by raising the pressure and temperature of the discharged refrigerant while keeping the occupant comfortable enough with a decrease in blowout temperature minimized.

According to the eighth aspect of the present disclosure, if a required blowout air temperature is not reached yet even after the operation modes have been switched from the first heating operation mode into the second heating operation mode, the electric heater is activated to heat the air-conditioning air. This thus allows for increasing the occupant's comfortableness.

According to the ninth aspect of the present disclosure, after the operation modes have been switched from the second heating operation mode into the defrosting operation mode, the refrigerant discharge rate of the compressor is increased, thus allowing for defrosting the exterior heat exchanger early.

According to the tenth aspect of the present disclosure, the operation modes are switched into the first heating operation mode after defrosting is done, thus enabling a high-efficiency heating operation.

According to the eleventh aspect of the present disclosure, after defrosting is done in the defrosting operation mode, the operation modes of the heat pump device are switched into the second heating operation mode and then into the first heating operation mode. Thus, a high-efficiency heating operation is enabled by raising the blowout temperature quickly and by switching the operation modes into the first heating operation mode early.

According to the twelfth aspect of the present disclosure, the operation modes may be switched from the second heating operation mode into the first heating operation mode at an appropriate timing based on the pressure of the refrigerant.

According to the thirteenth aspect of the present disclosure, the operation modes may be switched from the second heating operation mode into the first heating operation mode at an appropriate timing based on the blowout air temperature.

According to the fourteenth aspect of the present disclosure, the operation modes may be switched into the first heating operation mode at an appropriate timing based on the amount of time elapsed.

According to the fifteenth aspect of the present disclosure, if frosting is detected while a first heating mode of operation is being performed by the first and second interior heat exchangers, the operation modes are switched into a third heating operation mode in which the flow rate of the air-conditioning air passing through one of the two interior heat exchangers is decreased, and then switched into a defrosting operation mode. This thus allows for defrosting the exterior heat exchanger early and reliably.

DETAILED DESCRIPTION

Embodiments of the present disclosure will now be described in detail with reference to the accompanying drawings. Note that the following description of preferred embodiments is only an example in nature and is not intended to limit the scope, applications, or use of the present disclosure.

Figure 1:
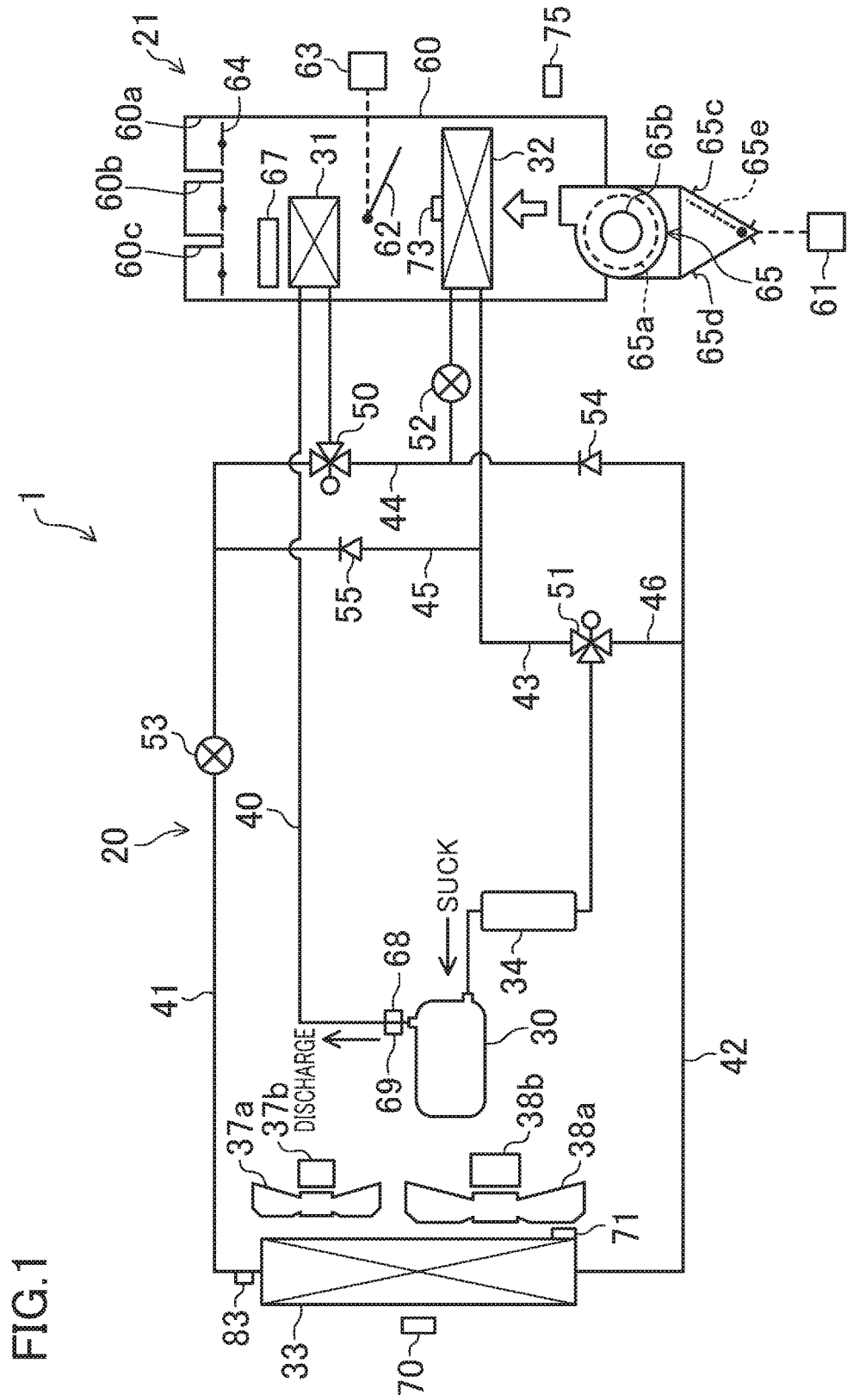
FIG. 1 is a diagram illustrating a general configuration for a vehicle air conditioner according to an embodiment.

FIG. 1 illustrates a general configuration for a vehicle air conditioner 1 according to an embodiment of the present disclosure. A vehicle on which the vehicle air conditioner 1 is mounted may be an electric car including a traction battery (not shown) and a traction motor (not shown).

This vehicle air conditioner 1 includes a heat pump device 20, an interior air-conditioning unit 21, and an air-conditioning controller 22 (shown in FIG. 2) that controls the heat pump device 20 and the interior air-conditioning unit 21.

The heat pump device 20 includes: a motor-driven compressor 30 that compresses a refrigerant; a downstream interior heat exchanger (first interior heat exchanger) 31 provided inside a vehicle cabin; an upstream interior heat exchanger (second interior heat exchanger) 32 provided upstream of the downstream interior heat exchanger 31 in an airflow direction inside the vehicle cabin; an exterior heat exchanger 33 provided outside the vehicle cabin; an accumulator 34; and first to fourth main refrigerant pipes 40-43 and first to third branch refrigerant pipes 44-46 that connect all of these members 30 to 34 together.

The motor-driven compressor 30 is an onboard compressor which has been known in the art, and is driven by an electric motor. The discharge rate per unit time is variable by changing the number of revolutions of the motor-driven compressor 30. The motor-driven compressor 30 is connected to the air-conditioning controller 22 so as to have its ON/OFF states switched and its number of revolutions controlled. The motor-driven compressor 30 is supplied with power from the traction battery.

The exterior heat exchanger 33 is provided near the front end of a motor room (corresponding to the engine room of an engine-driven vehicle) in a front portion of a vehicle, and is configured to catch the wind blowing against the vehicle traveling.

As shown in FIG. 1, the vehicle is further provided with first and second cooling fans 37a, 38a. The first and second cooling fans 37a and 38a are driven by first and second fan motors 37b, 38b, respectively, and are configured to blow air against the exterior heat exchanger 33. The first and second fan motors 37b, 38b are connected to the air-conditioning controller 22 so as to have their ON/OFF states switched and their number of revolutions controlled. The first and second fan motors 37b and 38b are also supplied with power from the traction battery. Note that the first and second fan motors 37b, 38b may also blow air against a radiator for cooling the traction inverter, for example, and may be activated even when air-conditioning is not required.

The accumulator 34 is provided near the suction port of the motor-driven compressor 30 and halfway along the fourth main refrigerant pipe 43.

On the other hand, the first main refrigerant pipe 40 connects together the discharge port of the motor-driven compressor 30 and the refrigerant inlet of the downstream interior heat exchanger 31. Moreover, the second main refrigerant pipe 41 connects together the refrigerant outlet of the downstream interior heat exchanger 31 and the refrigerant inlet of the exterior heat exchanger 33. The third main refrigerant pipe 42 connects together the refrigerant outlet of the exterior heat exchanger 33 and the refrigerant inlet of the upstream interior heat exchanger 32. The fourth main refrigerant pipe 43 connects together the refrigerant outlet of the upstream interior heat exchanger 32 and the suction port of the motor-driven compressor 30.

The first branch refrigerant pipe 44 branches from the second main refrigerant pipe 41, and is connected to the third main refrigerant pipe 42. The second branch refrigerant pipe 45 branches from the second main refrigerant pipe 41, and is connected to the fourth main refrigerant pipe 43. The third branch refrigerant pipe 46 branches from the third main refrigerant pipe 42, and is connected to the fourth main refrigerant pipe 43.

The heat pump device 20 further includes a first flow path switching valve 50, a second flow path switching valve 51, a first expansion valve 52, a second expansion valve 53, a first check valve 54, and a second check valve 55.

The first flow path switching valve 50 and the second flow path switching valve 51 are configured as electric three-way valves, and are controlled by the air-conditioning controller 22. The first flow path switching valve 50 is provided halfway along the second main refrigerant pipe 41, and the first branch refrigerant pipe 44 is connected to the valve 50. The second flow path switching valve 51 is provided halfway along the fourth main refrigerant pipe 43, and the third branch refrigerant pipe 46 is connected to the valve 51.

The first and second expansion valves 52 and 53 are electric types to be controlled by the air-conditioning controller 22 to operate in an opening direction and a closing direction. The degrees of opening of the first and second expansion valves 52 and 53 are ordinarily set according to the condition of the air-conditioning load, but may also be set to be an arbitrary degree irrespective of the air-conditioning load.

The first expansion valve 52 is provided closer to the upstream interior heat exchanger 32 than the point of connection between the third main refrigerant pipe 42 and the first branch refrigerant pipe 44 is, i.e., provided on a refrigerant pipe leading to the refrigerant inlet of the upstream interior heat exchanger 32. On the other hand, the second expansion valve 53 is provided on the second main refrigerant pipe 41.

The first check valve 54 is provided on the third main refrigerant pipe 42, and is configured to allow the refrigerant to flow through the third main refrigerant pipe 42 from the exterior heat exchanger 33 toward the upstream interior heat exchanger 32 and to prevent the refrigerant from flowing in the reverse direction.

The second check valve 55 is provided on the second branch refrigerant pipe 45, and is configured to allow the refrigerant to flow through the second branch refrigerant pipe 45 from the fourth main refrigerant pipe 43 toward the second main refrigerant pipe 41 and to prevent the refrigerant from flowing in the reverse direction.

The interior air-conditioning unit 21 further includes a casing 60 housing the downstream and upstream interior heat exchangers 31 and 32, an air mix door (temperature controlling door) 62, an air mix door actuator 63 that drives the air mix door 62, blowout-mode switching doors 64, a blower 65, and a PTC heater (electric heater) 67.

The blower 65 is provided to select one of the air inside the vehicle cabin (inside air) or the air outside the vehicle cabin (outside air) and blow the selected air as air-conditioning air into the casing 60. The blower 65 includes a sirocco fan 65a and a blower motor 65b that drives the sirocco fan 65a in rotation. The blower motor 65b is connected to the air-conditioning controller 22 to have its ON/OFF states switched and its number of revolutions controlled. The blower motor 65b is also supplied with electric power from the traction battery.

The blower 65 is provided with an inside air inlet port 65c to introduce the inside air and an outside air inlet port 65d to introduce the outside air. Inside the blower 65, provided is an inside/outside air switching door 65e to open one of the inside and outside air inlet ports 65c and 65d and close the other. The blower 65 is further provided with an inside/outside air switching door actuator 61 to drive the inside/outside air switching door 65e. This inside/outside air switching door actuator 61 is controlled by the air-conditioning controller 22. The blower 65 is configured to have its air introducing modes switched between an inside air introducing mode in which the inside air inlet port 65c is fully opened and the outside air inlet port 65d is fully closed and an outside air introducing mode in which the inside air inlet port 65c is fully closed and the outside air inlet port 65d is fully opened. The blower 65 is configured to allow the occupant to select either one of the inside and outside air introducing modes by turning a switch. Under a predetermined condition, however, the air-conditioning controller 22 is allowed to switch the air introducing modes automatically.

The casing 60 is provided inside an instrument panel (not shown) in the vehicle cabin. The casing 60 has a defroster blowout port 60a, a vent blowout port 60b, and a heat blowout port 60c. The defroster blowout port 60a is provided to supply the air-conditioning air to the inner surface of the windshield in the vehicle cabin. The vent blowout port 60b is provided to supply the air-conditioning air to mainly the upper body of the occupant in the vehicle cabin. The heat blowout port 60c is provided to supply the air-conditioning air to the feet of the occupant in the vehicle cabin.

These blowout ports 60a-60c are each opened and closed by an associated one of the blowout-mode switching doors 64. Although not shown, the blowout-mode switching doors 64 are operated by an actuator connected to the air-conditioning controller 22.

Examples of the blowout modes include a defroster blowout mode in which the air-conditioning air is supplied to the defroster blowout port 60a, a vent blowout mode in which the air-conditioning air is supplied to the vent blowout port 60b, a heat blowout mode in which the air-conditioning air is supplied to the heat blowout port 60c, a defroster/heat mode in which the air-conditioning air is supplied to the defroster blowout port 60a and the heat blowout port 60c, and a bi-level mode in which the air-conditioning air is supplied to the vent blowout port 60b and the heat blowout port 60c.

All of the air-conditioning air introduced into the casing 60 passes through the upstream interior heat exchanger 32.

In the casing 60, the air mix door 62 is provided between the upstream and downstream interior heat exchangers 32 and 31. The air mix door 62 is configured to control the temperature of the air-conditioning air such that the air that has passed through the upstream interior heat exchanger 32 which is going to pass through the downstream interior heat exchanger 31 has its flow rate changed to determine a mixing ratio between the air that has passed through the upstream interior heat exchanger 32 and the air that has passed through the downstream interior heat exchanger 31.

The PTC heater 67 is arranged downstream of the downstream interior heat exchanger 31 in the airflow direction inside the casing 60 in order to heat the air-conditioning air flowing inside the casing 60. The PTC heater 67 is controlled by the air-conditioning controller 22 so as to have its ON/OFF states switched and have the degree of heating changed. The PTC heater 67 is supplied with electric power from the traction battery.

The vehicle air conditioner 1 further includes a discharged refrigerant temperature sensor 68, a discharged refrigerant pressure sensor 69, an outside air temperature sensor 70, an exterior heat exchanger temperature sensor 71, an interior heat exchanger temperature sensor 73, an inside air temperature sensor 75, and an exterior refrigerant temperature sensor 83. These sensors are connected to the air-conditioning controller 22.

The discharged refrigerant temperature sensor 68 and discharged refrigerant pressure sensor 69 constitute a refrigerant state detecting means for detecting the state of the refrigerant discharged from the motor-driven compressor 30, and are provided in the vicinity of the discharge port of the motor-driven compressor 30. The discharged refrigerant temperature sensor 68 is a temperature sensor that detects the temperature of the refrigerant discharged from the motor-driven compressor 30. The discharged refrigerant pressure sensor 69 is a pressure sensor that detects the pressure of the refrigerant discharged from the motor-driven compressor 30.

The outside air temperature sensor 70 is provided upstream of the exterior heat exchanger 33 in the airflow direction in order to detect the temperature of the outside air (outside air temperature) that has not entered the exterior heat exchanger 33 yet. On the other hand, the exterior heat exchanger temperature sensor 71 is arranged on a surface of the exterior heat exchanger 33 which is located downstream in the airflow direction in order to detect a surface temperature of the exterior heat exchanger 33.

The interior heat exchanger temperature sensor 73 is provided downstream of the upstream interior heat exchanger 32 in the airflow direction in order to detect a surface temperature of the upstream interior heat exchanger 32.

The inside air temperature sensor 75 is provided to detect the temperature inside the vehicle cabin (the inside air temperature) and is arranged at a predetermined position inside the vehicle cabin. The inside air temperature sensor 75 is a sensor that has been known in the art, and a detailed description thereof will be omitted herein.

The exterior refrigerant temperature sensor 83 is provided at the refrigerant inlet of the exterior heat exchanger 33 to detect the temperature of the refrigerant at the refrigerant inlet of the exterior heat exchanger 33.

Although not shown, the vehicle air conditioner 1 also includes a solar radiation sensor and other kinds of sensors.

The air-conditioning controller 22 is configured to control the heat pump device 20 and other components by reference to multiple pieces of information including the temperature set by the occupant, the outside air temperature, the temperature inside the vehicle cabin, and the intensity of solar radiation. The air-conditioning controller 22 may be implemented as a well-known central processing unit (CPU), a ROM, or a RAM, for example. In addition, the air-conditioning controller 22 further controls the motor-driven compressor 30 and the first and second fan motors 37b, 38b depending on the air-conditioning load.

As in an ordinary automatic air-conditioning control, the air-conditioning controller 22 controls, through a main routine, a switch of the operation modes of the heat pump device 20, the volume of the air to be blown by the blower 65, the degree of opening of the air mix door 62, a switch of the blowout modes, the motor-driven compressor 30, and the blower motor 65b. For example, the fan motors 37b, 38b are basically activated while the motor-driven compressor 30 is running. However, even if the motor-driven compressor 30 is at a stop, the fan motors 37b, 38b are also activated when the traction inverter or any other member needs to be cooled.

The heat pump device 20 has a plurality of operation modes including a cooling operation mode, a first heating operation mode, a second heating operation mode, and a defrosting operation mode.

Figure 3:
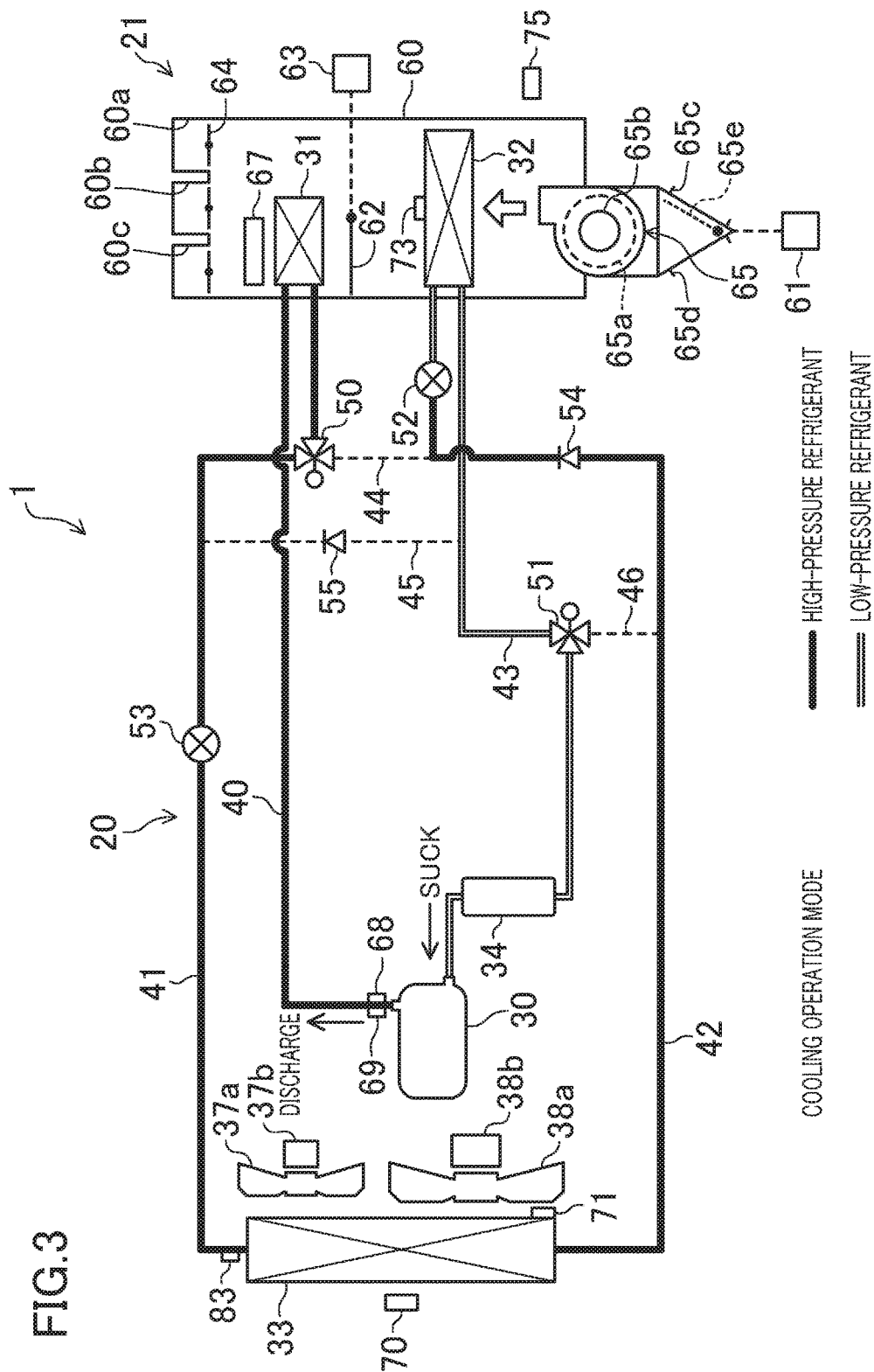
FIG. 3 is a diagram illustrating a cooling mode of operation and corresponding to FIG. 1.

The cooling operation mode shown in FIG. 3 is selected when the outside air temperature is higher than 25° C., for example. In the cooling operation mode, the downstream interior heat exchanger 31 is made to function as a radiator, the upstream interior heat exchanger 32 is made to function as a heat absorber, and the exterior heat exchanger 33 is made to function as a radiator.

Specifically, the first flow path switching valve 50 switches the flow paths such that a refrigerant that has flowed out of the downstream interior heat exchanger 31 does not flow into the upstream interior heat exchanger 32 through the inlet thereof but flows toward the second expansion valve 53. On the other hand, the second flow path switching valve 51 switches the flow paths such that the refrigerant that has flowed out of the upstream interior heat exchanger 32 flows into the accumulator 34. The first expansion valve 52 is turned into an expansion state, and the second expansion valve 53 is turned into a non-expansion state. If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. The refrigerant that has circulated through the downstream interior heat exchanger 31 flows, without expanding, into the exterior heat exchanger 33 through the second main refrigerant pipe 41. The refrigerant that has flowed into the exterior heat exchanger 33 dissipates heat, and expands by passing through the first expansion valve 52 via the third main refrigerant pipe 42. Then, the refrigerant flows into the upstream interior heat exchanger 32. The refrigerant that has flowed into the upstream interior heat exchanger 32 circulates through the upstream interior heat exchanger 32 to absorb heat from the air-conditioning air. The refrigerant that has circulated through the upstream interior heat exchanger 32 passes through the fourth main refrigerant pipe 43 and is sucked into the motor-driven compressor 30 via the accumulator 34.

Figure 4:
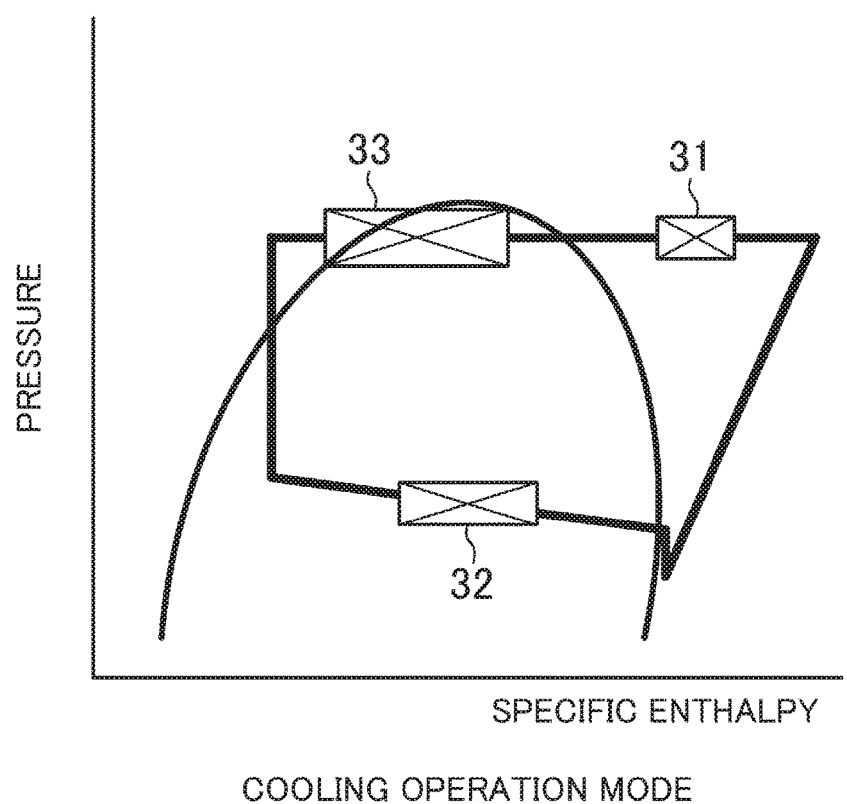
FIG. 4 is a Mollier chart illustrating how the heat pump device operates in the cooling operation mode.

In the cooling operation mode, the phase of the refrigerant changes with the pressure as shown in FIG. 4. Specifically, the refrigerant dissipates heat in the downstream interior heat exchanger 31 and exterior heat exchanger 33, expands, and then absorbs heat in the upstream interior heat exchanger 32.

Figure 5:
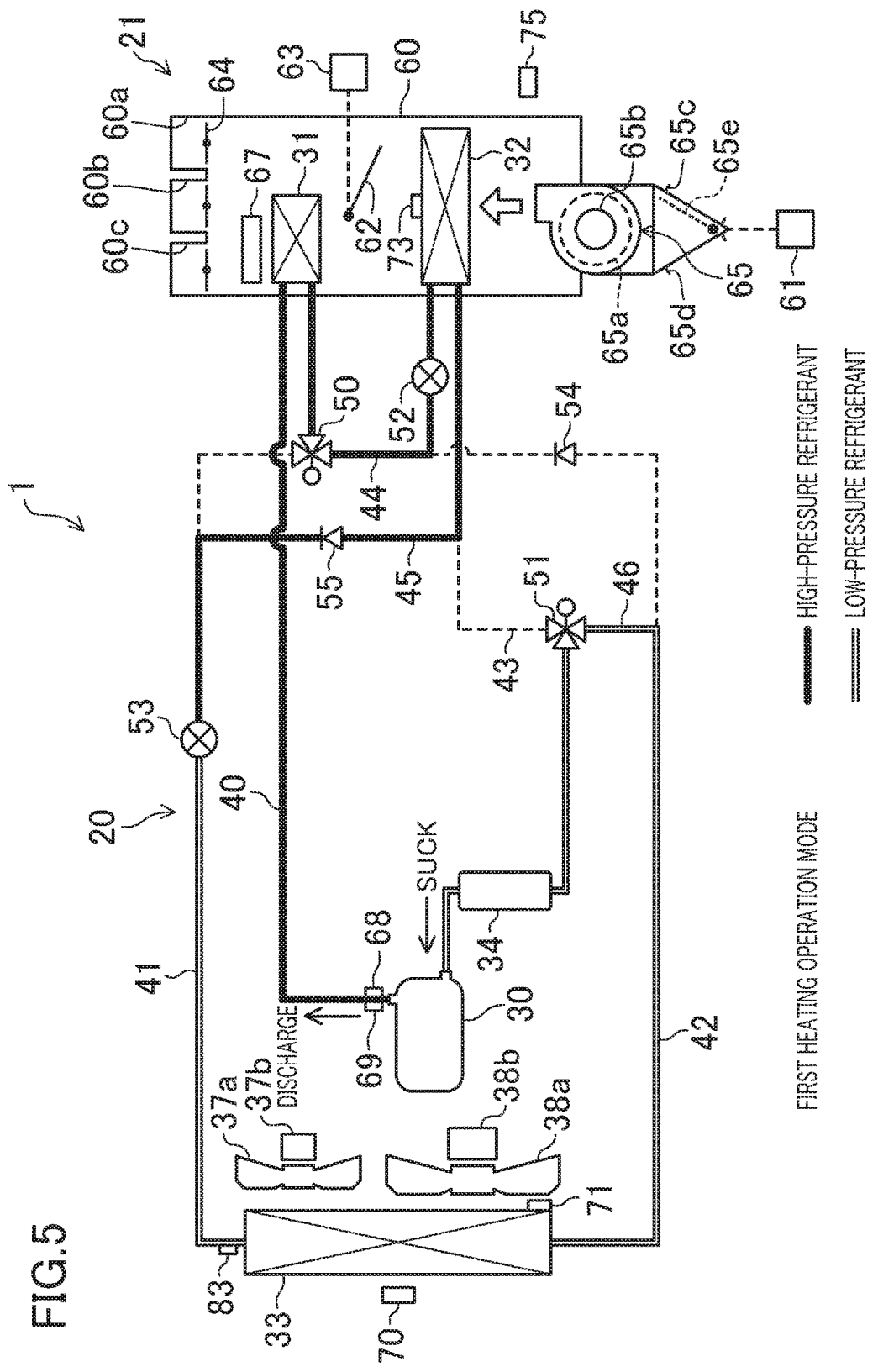
FIG. 5 is a diagram illustrating a first heating mode of operation and corresponding to FIG. 1.

The first heating operation mode shown in FIG. 5 is selected when the outside air temperature is lower than 0° C. (at an extremely-low outside air temperature), for example. In the first heating operation mode, the downstream and upstream interior heat exchangers 31 and 32 are made to function as radiators, and the exterior heat exchanger 33 is made to function as a heat absorber.

Specifically, the first flow path switching valve 50 switches the flow paths such that the refrigerant that has flowed out of the downstream interior heat exchanger 31 flows into the upstream interior heat exchanger 32 through the inlet thereof. Meanwhile, the second flow path switching valve 51 switches the flow paths such that the refrigerant that has flowed out of the exterior heat exchanger 33 flows into the accumulator 34. The first expansion valve 52 is turned into a non-expansion state, and the second expansion valve 53 is turned into an expansion state.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. The refrigerant that has circulated through the downstream interior heat exchanger 31 flows through the second main refrigerant pipe 41 into the upstream interior heat exchanger 32 via the first branch refrigerant pipe 44. Then, the refrigerant circulates through the upstream interior heat exchanger 32. That is, since the high-temperature refrigerant flows into the downstream and upstream interior heat exchangers 31 and 32, the air-conditioning air is heated by both of the downstream and upstream interior heat exchangers 31 and 32. As a result, a high heating capacity is achieved.

The refrigerant that has circulated through the upstream interior heat exchanger 32 flows through the fourth main refrigerant pipe 43 into the second main refrigerant pipe 41 via the second branch refrigerant pipe 45. The refrigerant flowing into the second main refrigerant pipe 41 expands by passing through the second expansion valve 53, and then flows into the exterior heat exchanger 33. The refrigerant that has flowed into the exterior heat exchanger 33 absorbs heat from the outside air. Then, the refrigerant passes through the third main refrigerant pipe 42 and the third branch refrigerant pipe 46 in this order, and is sucked into the motor-driven compressor 30 by way of the accumulator 34.

Figure 6:
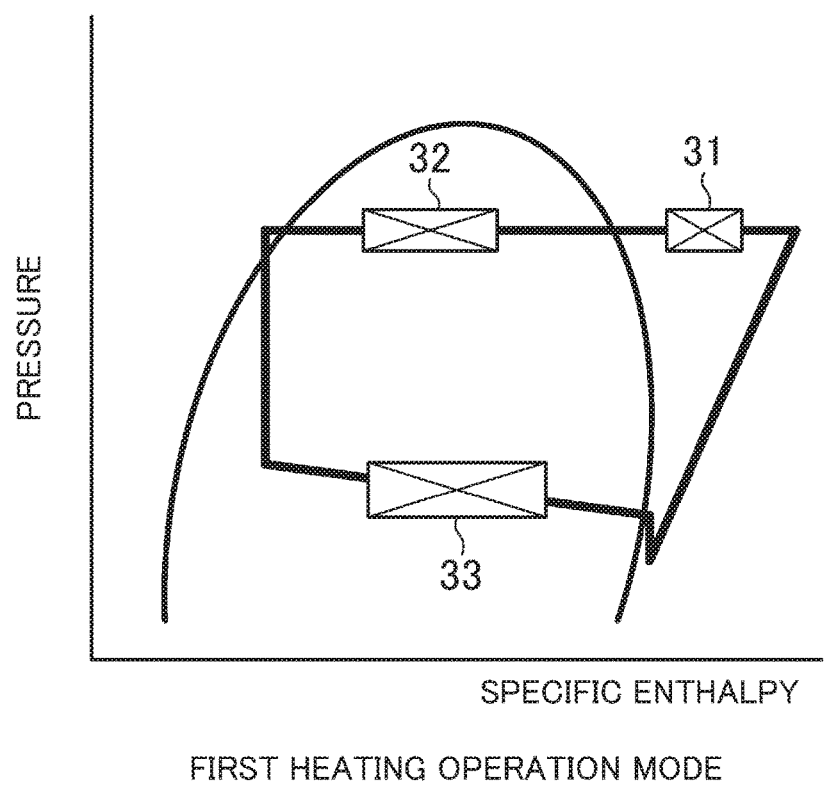
FIG. 6 is a Mollier chart illustrating how the heat pump device operates in the first heating operation mode.

In the first heating operation mode, the phase of the refrigerant changes with the pressure as shown in FIG. 6. Specifically, the refrigerant dissipates heat in the downstream and upstream interior heat exchangers 31 and 32, expands, absorbs heat in the exterior heat exchanger 33, and then is sucked into the motor-driven compressor 30.

Figure 7:
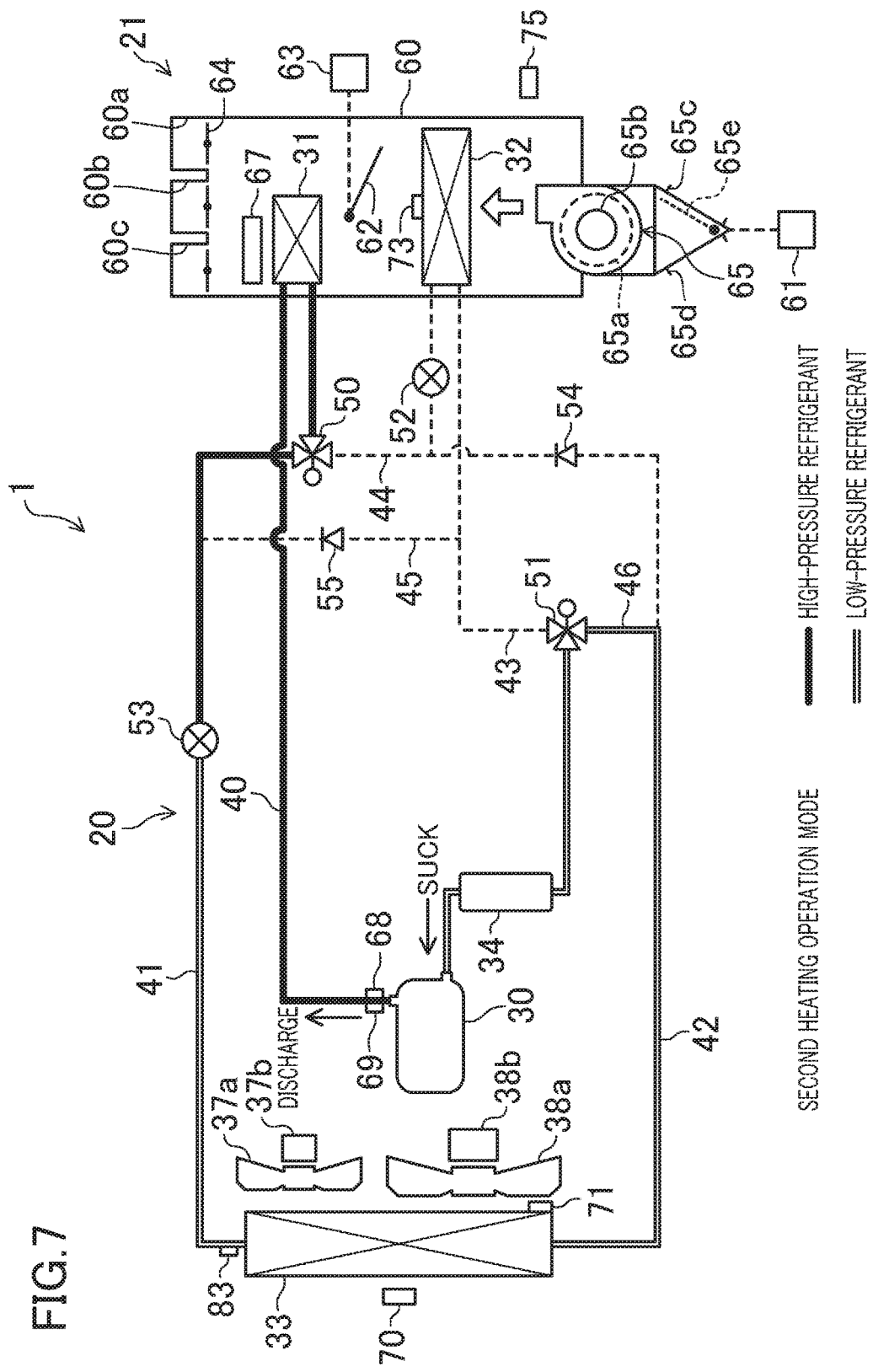
FIG. 7 is a diagram illustrating a second heating mode of operation and corresponding to FIG. 1.

The second heating operation mode shown in FIG. 7 is selected when the outside air temperature is equal to or higher than 0° C., for example. In the second heating operation mode, the downstream interior heat exchanger 31 is made to function as a radiator, the exterior heat exchanger 33 is made to function as a heat absorber, and no refrigerant is allowed to flow through the upstream interior heat exchanger 32.

Specifically, the first flow path switching valve 50 switches the flow paths such that the refrigerant that has flowed out of the downstream interior heat exchanger 31 flows into the exterior heat exchanger 33 through the inlet thereof. Meanwhile, the second flow path switching valve 51 switches the flow paths such that the refrigerant that has flowed out of the exterior heat exchanger 33 flows into the accumulator 34. The second expansion valve 53 is turned into an expansion state.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. The refrigerant that has circulated through the downstream interior heat exchanger 31 flows through the second main refrigerant pipe 41, passes through the second expansion valve 53, and then flows into the exterior heat exchanger 33. Then, the refrigerant circulates through the exterior heat exchanger 33. That is, since the high-temperature refrigerant does not flow into the upstream interior heat exchanger 32, the air-conditioning air is heated by only the downstream interior heat exchanger 31. As a result, the heating capacity becomes lower in the second heating operation mode than in the first heating operation mode.

The refrigerant that has circulated through the exterior heat exchanger 33 passes through the third main refrigerant pipe 42 and the third branch refrigerant pipe 46 in this order, and is sucked into the motor-driven compressor 30 by way of the accumulator 34.

Figure 8:
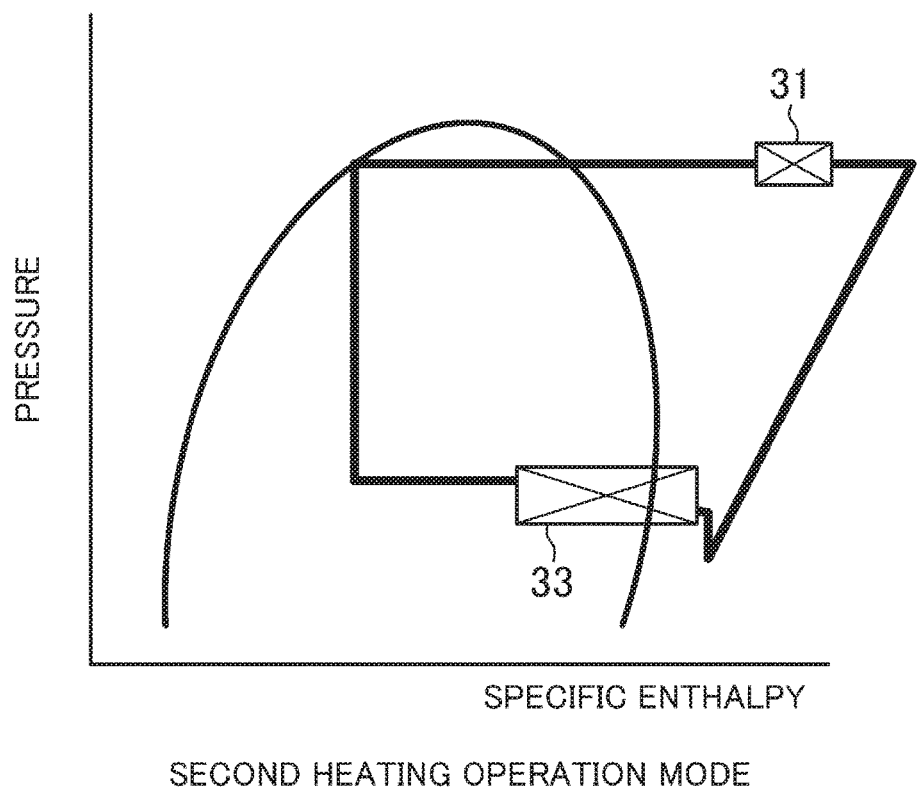
FIG. 8 is a Mollier chart illustrating how the heat pump device operates in the second heating operation mode.

In the second heating operation mode, the phase of the refrigerant changes with the pressure as shown in FIG. 8. Specifically, the refrigerant dissipates heat in the downstream interior heat exchanger 31, expands, and then absorbs heat in the exterior heat exchanger 33.

Figure 9:
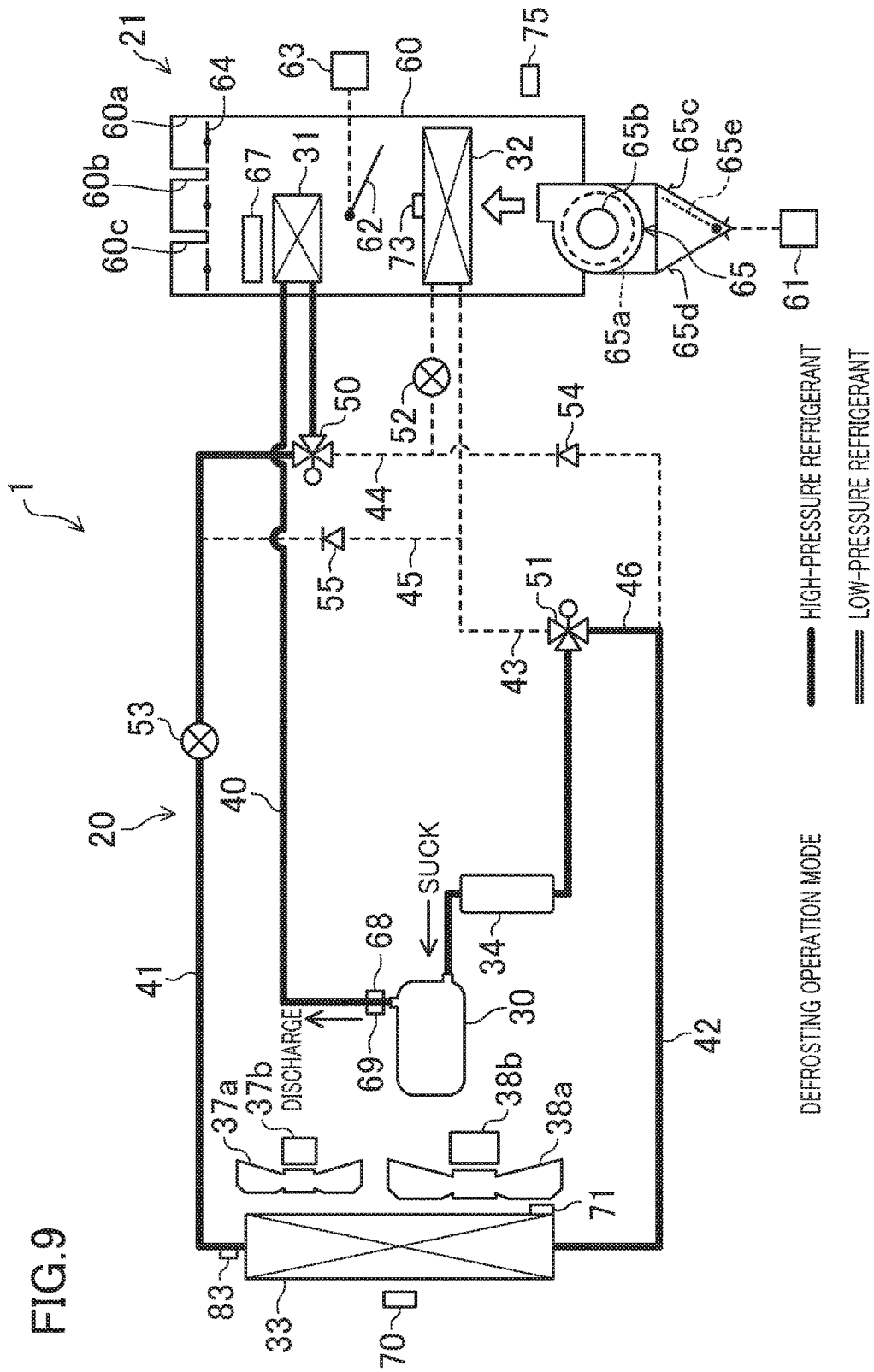
FIG. 9 is a diagram illustrating a defrosting mode of operation and corresponding to FIG. 1.

The defrosting operation mode shown in FIG. 9 is selected in order to melt the frost formed, if any, in the exterior heat exchanger 33 during heating. In the defrosting operation mode, the downstream interior heat exchanger 31 and the exterior heat exchanger 33 are made to function as radiators, and no refrigerant is allowed to flow through the upstream interior heat exchanger 32.

Specifically, the first flow path switching valve 50 switches the flow paths so as to prevent the refrigerant that has flowed out of the downstream interior heat exchanger 31 from flowing into the upstream interior heat exchanger 32 through its inlet and to allow the refrigerant to flow toward the second expansion valve 53. Meanwhile, the second flow path switching valve 51 switches the flow paths so as to allow the refrigerant that has flowed out of the exterior heat exchanger 33 to flow into the accumulator 34. The second expansion valve 53 is turned into a non-expansion state.

If the motor-driven compressor 30 is activated in this state, the refrigerant discharged from the motor-driven compressor 30 circulates through the downstream interior heat exchanger 31, and then flows into the exterior heat exchanger 33 without expanding by passing through the second main refrigerant pipe 41. The refrigerant that has flowed into the exterior heat exchanger 33 dissipates heat to melt the frost there. Thereafter, the refrigerant passes through the third main refrigerant pipe 42 and the third branch refrigerant pipe 46 in this order and then is sucked into the motor-driven compressor 30 via the accumulator 34.

Figure 2:
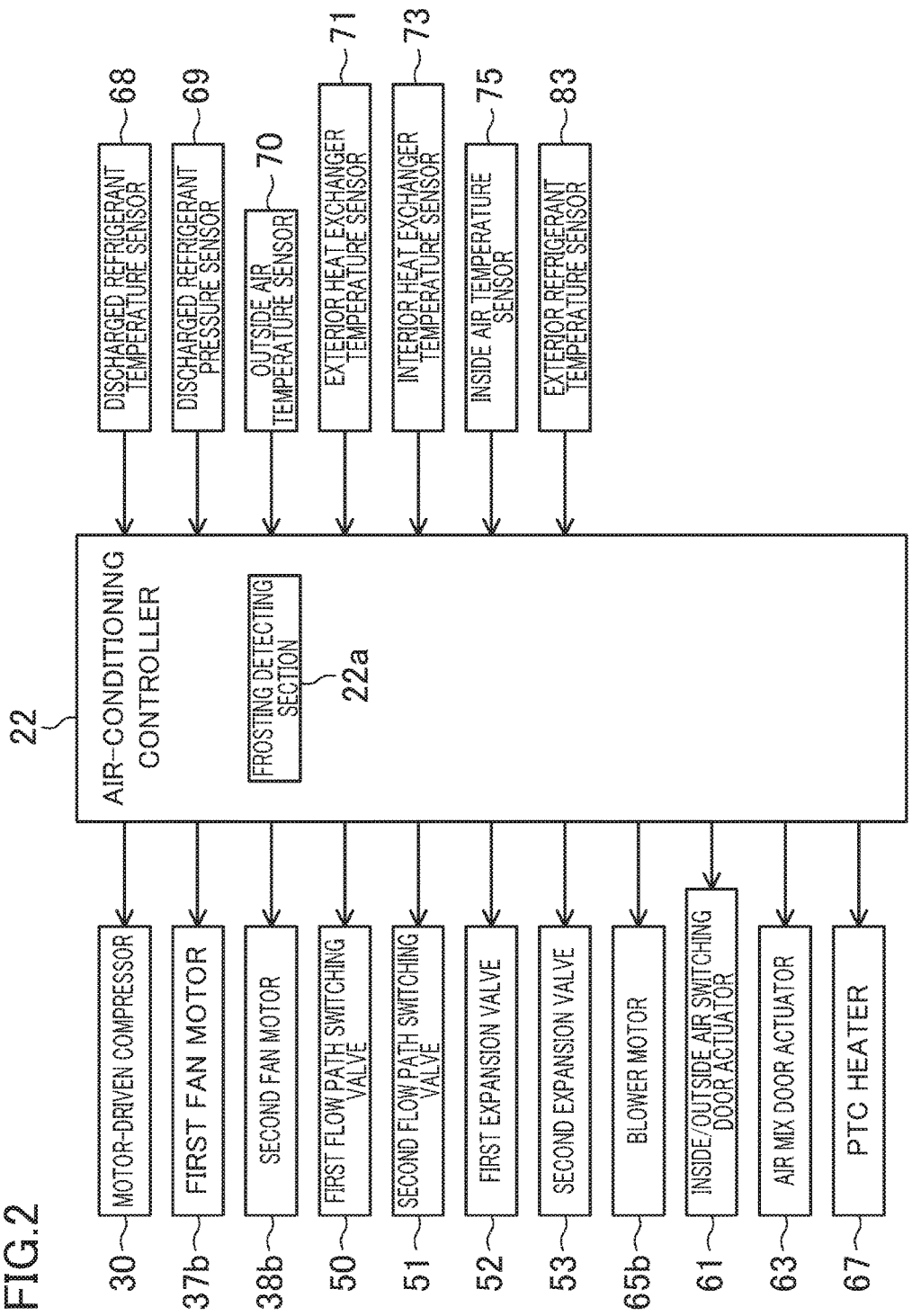
FIG. 2 is a block diagram of the vehicle air conditioner.

As shown in FIG. 2, the air-conditioning controller 22 includes a frosting detecting section (frosting state detecting means) 22a which determines whether or not frost has been formed in the exterior heat exchanger 33 and how much frost has been formed there, if any. The frosting detecting section 22a subtracts the surface temperature of the exterior heat exchanger 33 that has been detected by the exterior heat exchanger temperature sensor 71 from the outside air temperature (TG) detected by the outside air temperature sensor 70, and decides that frosting has been detected if the difference is greater than 20° C., for example. That is to say, the frosting detecting section 22a detects frosting based on the fact that once frost has been formed in the exterior heat exchanger 33, the refrigerant can no longer absorb heat and the temperature of the refrigerant does not rise in the exterior heat exchanger 33. Thus, the value of 20 is just an example and any other value may also be adopted as long as the frosting detecting section 22a may determine, based on that value, whether or not the exterior heat exchanger 33 is frosted. Alternatively, formation of frost may even be detected directly. Also, the amount of frost formed may be detected based on the difference between the outside air temperature (TG) detected by the outside air temperature sensor 70 and the temperature detected by the exterior heat exchanger temperature sensor 71. Specifically, the greater the difference between them, the larger the amount of frost formed there is estimated to be.

In this embodiment, the frosting detecting section 22a may determine whether or not the amount of frost formed in the exterior heat exchanger 33 is equal to or greater than a first predetermined amount and equal to or greater than a second predetermined amount that is larger than the first predetermined amount. The first predetermined amount is set to be such an amount that makes it difficult for the exterior heat exchanger 33 to absorb heat, and the second predetermined amount is set to be such an amount that makes it almost impossible for the exterior heat exchanger 33 to absorb heat and makes it impossible to perform a heating mode of operation.

The target blowout temperature of the air being blown out from the interior air-conditioning unit 21 is calculated by the air-conditioning controller 22 based on the temperature set by the occupant and the outside air temperature, for example.

Next, the procedure of control to be performed by the air-conditioning controller 22 will be described. Although not shown, in the main routine, if the outside air temperature (TG) detected by the outside air temperature sensor 70 is lower than 0° C., for example, the operation modes of the heat pump device 20 are switched into a heating operation mode. Also, the air-mix door 62 is operated so that the temperature of the blown air becomes as high as the target temperature. Examples of the heating operation mode include the first heating operation mode and the second heating operation mode.

If the outside air temperature (TG) is within the range of 0° C. to 25° C., the air-conditioning controller 22 allows for performing heating while dehumidifying. However, if the outside air temperature (TG) is higher than 25° C., then the operation modes of the heat pump device 20 are switched into the cooling operation mode.

Figure 10:
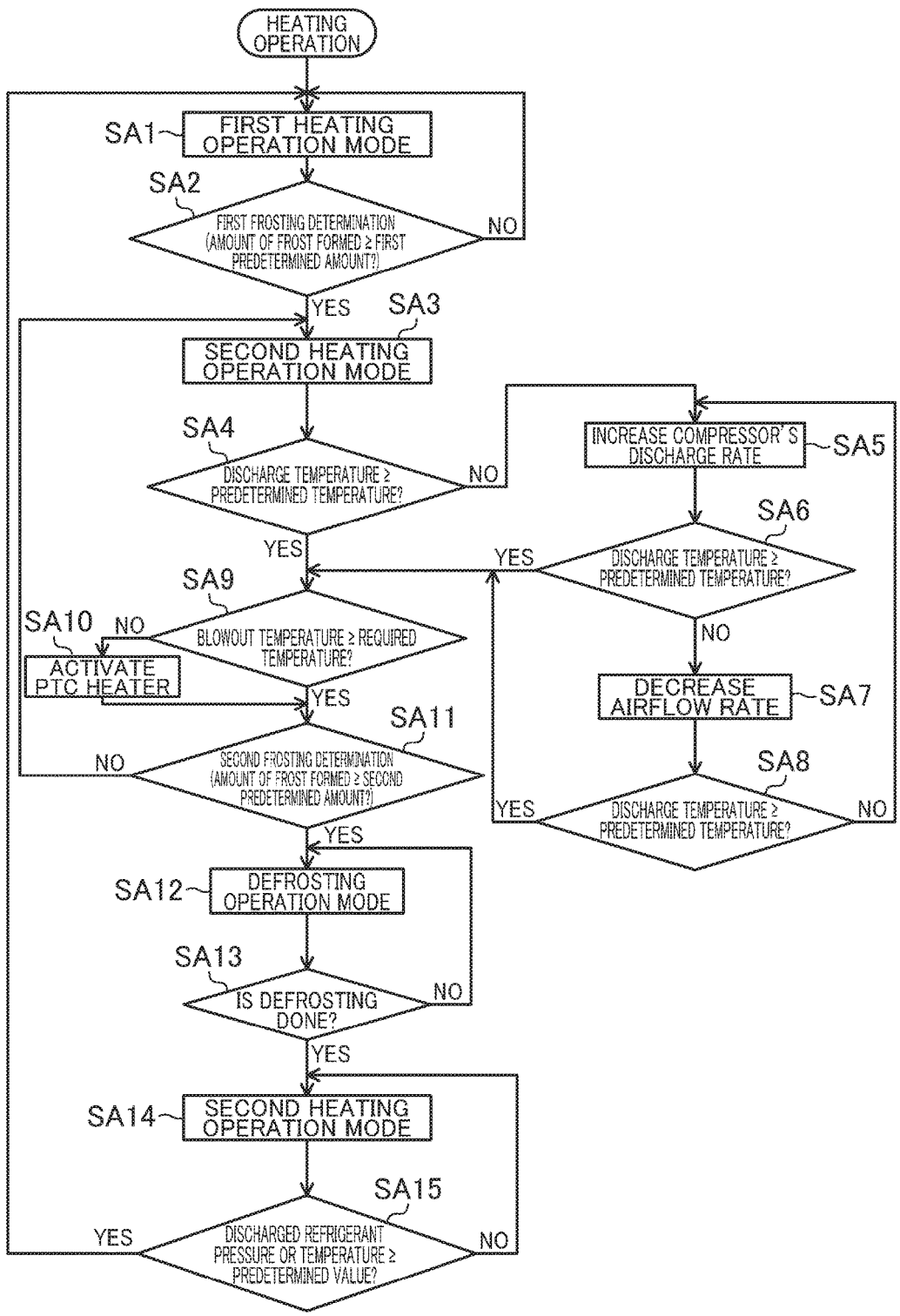
FIG. 10 is a flowchart showing the procedure of a heating operation subroutine control.

If a heating operation mode has been selected in the main routine, the heating operation subroutine control shown in FIG. 10 is performed. In performing the heating operation subroutine control, first, in Step SA1, the operation mode of the heat pump device 20 is set to be the first heating operation mode. After that, the process proceeds to Step SA2 to make a first frosting determination. In making the first frosting determination, a determination is made whether or not the amount of frost formed in the exterior heat exchanger 33 that has been detected by the frosting detecting section 22a is equal to or greater than the first predetermined amount. If the answer to the question of Step SA2 is NO, then the amount of frost formed in the exterior heat exchanger 33 is either zero or small enough to neglect. Thus, the process goes back to Step SA1 to keep performing the operation in the first heating operation mode to provide high-efficiency heating.

On the other hand, if the answer to the question of Step SA2 is YES (i.e., if a lot of frost has been formed in the exterior heat exchanger 33), the process proceeds to Step SA3 to switch the operation modes of the heat pump device 20 from the first heating operation mode into the second heating operation mode. After that, the process proceeds to Step SA4 to determine whether or not the temperature of the refrigerant discharged from the motor-driven compressor 30 is equal to or higher than a predetermined temperature. The "predetermined temperature" in Step S4 refers herein to a temperature of the air finally blown out into the vehicle cabin during heating which is moderate enough to almost keep the occupant from feeling uncomfortable. If the answer to the question of Step SA4 is NO (i.e., if the temperature of the discharged refrigerant is lower than the predetermined temperature), then the process proceeds to Step SA5 to increase the discharge rate per unit time of the refrigerant being discharged from the motor-driven compressor 30 and to raise the discharge temperature. After that, the process proceeds to Step SA6 to make a determination in the same way as in Step SA4. If the answer to the question of Step SA6 is NO, then the discharge temperature is still short of the predetermined temperature, which sometimes makes the occupant uncomfortable. In that case, the process proceeds to Step SA7 to decrease the flow rate of the air being blown by the blower 65. In this manner, the flow rate of the low-temperature air being blown out into the vehicle cabin is reduced to prevent the occupant from feeling uncomfortable easily. Thereafter, the process proceeds to Step SA8 to make a determination in the same way as in Step SA4. If the answer to the question of Step SA8 is NO, then the discharge temperature is still short of the predetermined temperature. Thus, the process proceeds to Step SA5 to further increase the discharge rate per unit time of the refrigerant being discharged from the motor-driven compressor 30.

On the other hand, if the answers to the questions of Steps SA4, SA6 and SA8 are YES (i.e., if the discharge temperature is equal to or higher than the predetermined temperature), then the process proceeds to Step SA9 to determine in turn whether or not the temperature of the air being finally blown out from the interior air-conditioning unit 21 into the vehicle cabin is equal to or higher than a required temperature. The "required temperature" in Step SA9 refers herein to a target temperature that the air-conditioning air needs to have in order to heat the air inside the vehicle cabin, for example. If the answer to the question of Step SA9 is NO (i.e., if the temperature of the blown air is lower than the required temperature), then the process proceeds to Step SA10 to activate the PTC heater 67 to heat the air-conditioning air.

On the other hand, if the answer to the question of Step SA9 is YES (i.e., if the temperature of the blown air is equal to or higher than the required temperature) and if the process has proceeded to Step SA10 to activate the PTC heater 67, then the process proceeds to Step SA11 to make a second frosting determination. Specifically, in Step SA11, a determination is made whether or not the amount of frost formed in the exterior heat exchanger 33 that has been detected by the frosting detecting section 22a is equal to or greater than a second predetermined amount.

If the answer to the question of Step SA11 is NO, then not so much frost has been formed in the exterior heat exchanger 33 and the heat should be absorbed to a certain degree. Thus, the process proceeds to Step SA3 to keep performing the second heating mode of operation in that case.

On the other hand, if the answer to the question of Step SA11 is YES (i.e., if frost has been formed so much in the exterior heat exchanger 33 that it is difficult to absorb the heat), then the process proceeds to Step SA12 to change the operation modes of the heat pump device 20 into a defrosting operation mode.

In Step SA13 to which the process proceeds after the operation modes have been switched into the defrosting operation mode, a determination is made whether or not the exterior heat exchanger 33 has been defrosted yet. If the frosting detecting section 22a finds the amount of frost formed in the exterior heat exchanger 33 to be either zero or small enough to neglect, then the answer to the question of Step SA13 is YES. On the other hand, if the frosting detecting section 22a finds the amount of frost formed in the exterior heat exchanger 33 to be too large to absorb the heat easily, then the defrosting mode of operation is continued.

If the answer to the question of Step SA13 is YES, the process proceeds to Step SA14 to switch the operation modes of the heat pump device 20 into the second heating operation mode. Thereafter, the process proceeds to Step SA15 to determine whether or not the pressure of the refrigerant discharged from the motor-driven compressor 30 is equal to or higher than a predetermined pressure or whether or not its temperature is equal to or higher than a predetermined temperature. If the answer to the question of Step SA15 is YES (i.e., if the pressure of the refrigerant is equal to or higher than a predetermined pressure or if its temperature is equal to or higher than a predetermined temperature), the process proceeds to Step SA1 to change the operation modes of the heat pump device 20 into the first heating operation mode. On the other hand, if the answer to the question of Step SA15 is NO (i.e., if the pressure of the refrigerant is lower than the predetermined pressure and if its temperature is lower than the predetermined temperature), then the process proceeds to Step SA14 to keep performing the second heating mode of operation.

This is an exemplary heating operation subroutine. This subroutine is performed while a heating mode of operation is being performed or while a defrosting mode of operation is being performed. In the other operation modes, the control is carried out following a different subroutine.

Thus, if frosting is detected while the first heating mode of operation is being performed by the upstream and downstream interior heat exchangers 32 and 31, the vehicle air conditioner 1 of this embodiment changes the operation modes into the defrosting operation mode after having performed the second heating mode of operation in which the refrigerant is allowed to flow through the downstream interior heat exchanger 31. In the second heating operation mode, the temperature of the refrigerant discharged from the motor-driven compressor 30 rises compared to the first heating operation mode, and the temperature of the motor-driven compressor 30 itself rises to produce the heat storage effect in the motor-driven compressor 30. Consequently, a high-temperature refrigerant may flow through the exterior heat exchanger 33, thus allowing for defrosting the exterior heat exchanger 33 early and reliably.

Also, if the amount of frost formed in the exterior heat exchanger 33 has turned out in Step SA2 to be the first amount after the operation modes are switched into the first heating operation mode in Step SA1 of the flowchart shown in FIG. 10, then the operation modes of the heat pump device 20 are switched in Step SA3 into the second heating operation mode. Thereafter, if the amount of frost formed in the exterior heat exchanger 33 turns out in Step SA11 to be the second amount that is larger than the first amount, the operation modes of the heat pump device 20 are switched in Step SA12 into the defrosting operation mode. This allows for switching the operation modes according to the amount of frost formed and thereby defrosting the exterior heat exchanger 33 even more reliably.

Furthermore, if it turns out in Steps SA6 and SA8 of the flowchart shown in FIG. 10 that the temperature of the refrigerant discharged from the motor-driven compressor 30 has become equal to or higher than the predetermined temperature, the operation modes of the heat pump device 20 are switched from the second heating operation mode into the defrosting operation mode. This allows for defrosting the exterior heat exchanger reliably. Alternatively, the operation modes of the heat pump device 20 may be switched from the second heating operation mode into the defrosting operation mode if it turns out in Steps SA6 and SA8 that the pressure of the refrigerant discharged from the motor-driven compressor 30 is equal to or higher than the predetermined pressure.

Furthermore, the operation modes of the heat pump device 20 may be switched from the second heating operation mode into the defrosting operation mode by controlling the second expansion valve 53 in an opening direction. This eliminates the need for switching pipes through which the refrigerant flows, thus allowing for defrosting the exterior heat exchanger 33 reliably with the heat loss cut down.

Optionally, as a frosting state detecting means for detecting the frosting state of the exterior heat exchanger 33, a sensor for detecting the temperature of the refrigerant at the refrigerant inlet of the exterior heat exchanger 33 may be provided such that frosting is detected based on the refrigerant temperature provided by this sensor. This allows for detecting accurately the frosting state of the exterior heat exchanger 33 and performing the defrosting mode of operation at an appropriate timing.

Also, after the operation modes of the heat pump device 20 have been switched from the first heating operation mode into the second heating operation mode, the discharge rate per unit time of the refrigerant discharged from the motor-driven compressor 30 is increased in Step SA5 of the flowchart shown in FIG. 10 compared to the rate before the switch of the operation modes. This thus allows for defrosting the exterior heat exchanger 33 reliably during the defrosting mode of operation by raising the pressure and temperature of the discharged refrigerant while keeping the occupant comfortable enough with a decrease in the temperature of the air blown out into the vehicle cabin minimized.

In addition, after the operation modes of the heat pump device 20 have been switched from the first heating operation mode into the second heating operation mode, the airflow rate of the blower 65 is decreased in Step SA7 of the flowchart shown in FIG. 10 compared to the rate before the switch of the operation modes. This thus allows for defrosting the exterior heat exchanger 33 reliably by raising the pressure and temperature of the discharged refrigerant while keeping the occupant comfortable enough with a decrease in the blowout temperature minimized.

Furthermore, if the decision is made in Step SA9 of the flowchart shown in FIG. 10 that the current blowout air temperature is still short of the required temperature even after the operation modes of the heat pump device 20 have been switched from the first heating operation mode into the second heating operation mode, then the PTC heater 67 is activated in Step SA10. This thus allows for increasing the occupant's comfortableness.

Optionally, the control may also be performed such that after the operation modes of the heat pump device 20 have been switched from the second heating operation mode into the defrosting operation mode (i.e., after the processing step SA12 of the flowchart shown in FIG. 10 has been performed) and before the processing step SA13 is performed, the refrigerant discharge rate of the motor-driven compressor 30 is increased compared to the rate before the switch of the operation modes. This thus allows for defrosting the exterior heat exchanger 33 early.

In the embodiment described above, after the defrosting is done in the defrosting operation mode, the operation modes of the heat pump device 20 are supposed to be switched into the second heating operation mode. However, this is only a non-limiting exemplary embodiment. Alternatively, after the defrosting is done in the defrosting operation mode, the operation modes of the heat pump device 20 may be switched into the first heating operation mode, thus enabling a high-efficiency heating operation.

Furthermore, according to this embodiment, after the defrosting is done in the defrosting operation mode, the operation modes of the heat pump device 20 are switched into the second heating operation mode and then into the first heating operation mode. Thus, a high-efficiency heating operation is enabled by raising the blowout temperature quickly and by switching the operation modes into the first heating operation mode early.

Also, the decision is made in Step SA15 of the flowchart shown in FIG. 10 on the pressure level of the refrigerant and the operation modes of the heat pump device 20 are switched, based on the result of this decision, from the second heating operation mode into the first heating operation mode. This thus allows for switching the operation modes from the second heating operation mode into the first heating operation mode at an appropriate timing.

Optionally, instead of performing the processing step SA15 of the flowchart shown in FIG. 10, the blowout air temperature may be detected. If the blowout air temperature is equal to or higher than a predetermined temperature, the operation modes of the heat pump device 20 may be switched from the second heating operation mode into the first heating operation mode. On the other hand, if the blowout air temperature is lower than the predetermined temperature, the operation mode of the heat pump device 20 may be unchanged from the second heating operation mode. In this case, the predetermined temperature may be set to be a temperature in the vicinity of the target temperature.

Alternatively, when a predetermined amount of time passes since the operation modes of the heat pump device 20 were switched into the second heating operation mode in the processing step SA14 of the flowchart shown in FIG. 10, the operation modes may be switched into the first heating operation mode. In that case, the processing step SA15 may be omitted and instead a timer for recording the amount of time that has passed since the switch into the second heating operation mode may be used. The amount of time elapsed may be recorded with this timer. When it is estimated that an amount of time long enough to raise the blowout air temperature sufficiently has passed, the operation modes may be switched into the first heating operation mode. This thus allows for switching the operation modes into the first heating operation mode at an appropriate timing.

Figure 11:
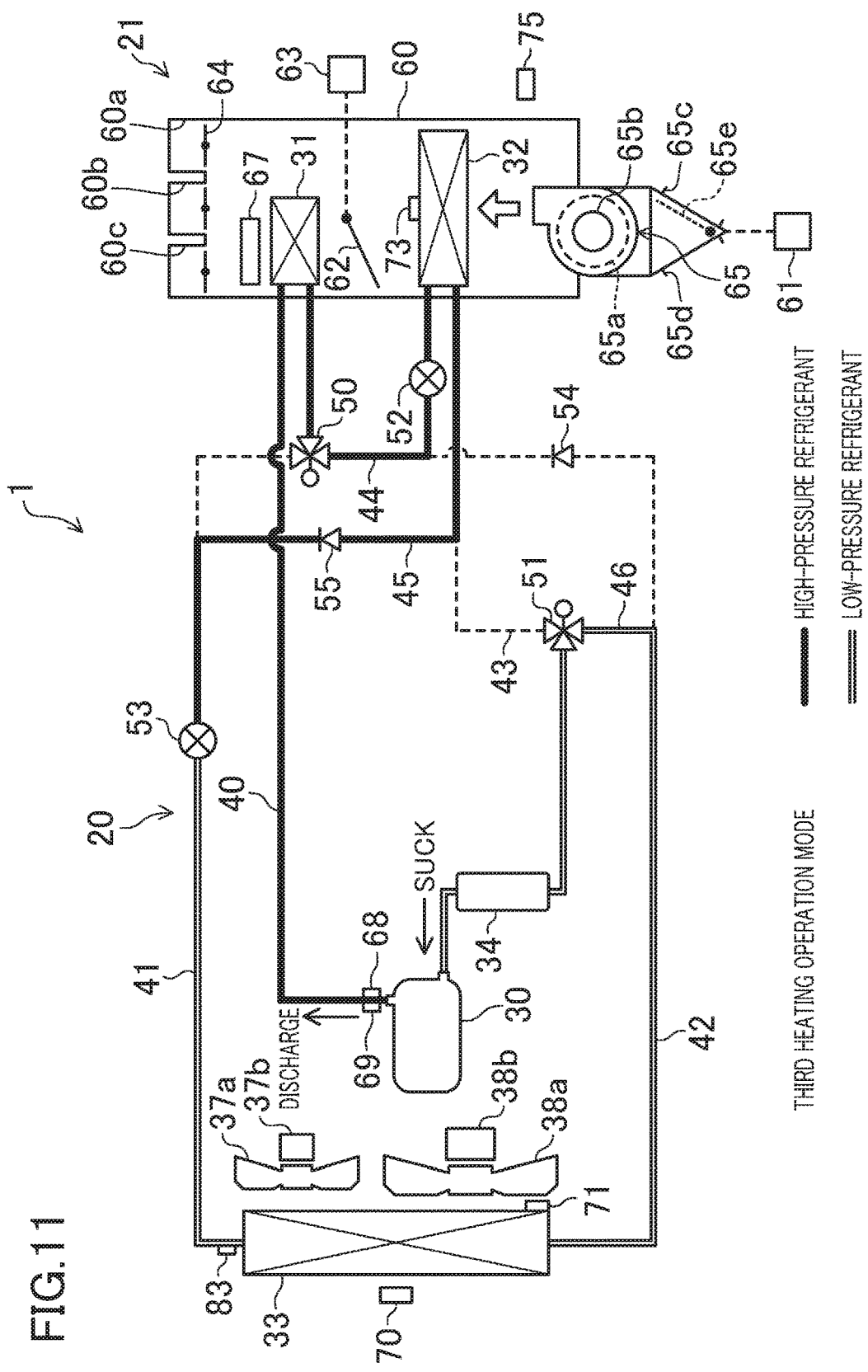
FIG. 11 is a diagram illustrating a third heating mode of operation and corresponding to FIG. 1.

In the embodiment described above, the operation modes are supposed to be switched into the second heating operation mode after the first heating mode of operation has been performed. However, the operation modes may also be switched into the third heating operation mode shown in FIG. 11, instead of the second heating operation mode, and then into the defrosting operation mode. In the third heating operation mode, the heat pump device 20 is made to operate in the same operation mode as the first heating operation mode, and the interior air-conditioning unit 21 turns the air mix door 62 as shown in FIG. 11 such that the quantity of the air-conditioning air passing through the downstream interior heat exchanger 31 decreases. The angle of rotation of the air mix door 62 is suitably determined such that the quantity of the air-conditioning air passing through the downstream interior heat exchanger 31 becomes approximately equal to zero. As used herein, "approximately equal to zero" refers to not only a situation where the air-conditioning air does not pass through the downstream interior heat exchanger 31 at all, but also a situation where even if the air mix door 62 is turned such that the quantity of the air-conditioning air passing through the downstream interior heat exchanger 31 becomes equal to zero, a small quantity of air-conditioning air still leaks through some gap left between the casing 60 and the air mix door 62 and passes through the downstream interior heat exchanger 31.

In the third heating operation mode, the heat transfer area of the heat exchanger functioning as a radiator may be decreased intentionally, and heat may be stored in the motor-driven compressor 30, by adjusting the degree of opening of the air mix door 62 as in the second heating operation mode. In this case, however, just the degree of opening of the air mix door 62 is changed and no pipes of the heat pump device 20 are switched. Thus, the modes may be switched easily and efficiently without causing any heat loss involved with such a switch of pipes. In addition, since a high-temperature refrigerant discharged from the motor-driven compressor 30 is supplied to the upstream interior heat exchanger 32 during the third heating mode of operation, heat may be stored in the upstream interior heat exchanger 32 itself and the heat thus stored may be supplied to the exterior heat exchanger 33 during a defrosting mode of operation.

If the operation modes are switched into the third heating operation mode after the first heating mode of operation has been performed, the flow rate of the air-conditioning air passing through the downstream interior heat exchanger 31 decreases, thus causing a decrease in the quantity of heat dissipated by the downstream interior heat exchanger 31. Thus, in the third heating operation mode, the temperature of the refrigerant discharged from the motor-driven compressor 30 rises compared to during the first heating mode of operation, and the temperature of the motor-driven compressor 30 itself rises to achieve a heat storage effect in the motor-driven compressor 30. As a result, a high-temperature refrigerant may flow through the exterior heat exchanger 33 during a defrosting mode of operation. This thus allows for defrosting the exterior heat exchanger 33 early and reliably.

Note that each and every embodiment described above is just an example in any respect and should not be construed to be a limiting one. Besides, any variations or modifications falling within the range of equivalents to the claims to be described below are all encompassed within the scope of the present disclosure.

As can be seen from the foregoing description, a vehicle air conditioner according to the present disclosure may be mounted on electric cars and hybrid cars, for example.

What is claimed is:

1. A vehicle air conditioner comprising:
a heat pump device including a compressor which compresses a refrigerant, a first interior heat exchanger provided inside a vehicle cabin, a second interior heat exchanger provided upstream of the first interior heat exchanger in an airflow direction inside the vehicle cabin, an exterior heat exchanger provided outside the vehicle cabin, and an expansion valve, the heat pump device being formed by connecting together the compressor, the first and second interior heat exchangers, the expansion valve, and the exterior heat exchanger via refrigerant piping;
an interior air-conditioning unit which houses the first and second interior heat exchangers, which includes a blower that blows air-conditioning air toward the first and second interior heat exchangers, and which is configured to produce air-conditioned air and supply the air-conditioned air into the vehicle cabin;
an outside air temperature sensor which detects an outside air temperature;
an exterior heat exchanger temperature sensor which detects a temperature of the exterior heat exchanger; and
an air-conditioning controller which controls the heat pump device and the interior air-conditioning unit, wherein
the air-conditioning controller is configured to detect a frosting state of the exterior heat exchanger based on a difference between the outside air temperature detected by the outside air temperature sensor and the temperature of the exterior heat exchanger detected by the exterior heat exchanger temperature sensor,
the heat pump device is switched by the air-conditioning controller into any of a plurality of operation modes including: a first heating operation mode in which a refrigerant discharged from the compressor is allowed to flow through the first and second interior heat exchangers without being expanded by the expansion valve; a second heating operation mode in which the refrigerant discharged from the compressor is allowed to flow through either the first interior heat exchanger or the second interior heat exchanger without being expanded by the expansion valve; and a defrosting operation mode in which the refrigerant discharged from the compressor is allowed to flow through the exterior heat exchanger without being expanded by the expansion valve, and
the air-conditioning controller is configured to switch the operation modes of the heat pump device into the second heating operation mode and then into the defrosting operation mode when the air-conditioning controller detects, while the operation mode of the heat pump device is the first heating operation mode, that the exterior heat exchanger is frosted.

2. The vehicle air conditioner of claim 1, wherein
the air-conditioning controller is configured to switch the operation modes of the heat pump device into the second heating operation mode when the air-conditioning controller detects that a first amount of frost has been formed on the exterior heat exchanger, and to switch the operation modes of the heat pump device into the defrosting operation mode when the air-conditioning controller detects thereafter that a second amount of frost that is larger than the first amount has been formed on the exterior heat exchanger.

3. The vehicle air conditioner of claim 1, comprising a refrigerant state detecting means for detecting a state of the refrigerant discharged from the compressor, wherein
the air-conditioning controller is configured to switch the operation modes of the heat pump device from the second heating operation mode into the defrosting operation mode when the refrigerant state detecting means senses that either the temperature or pressure of the refrigerant discharged from the compressor has become equal to or greater than a predetermined value.

4. The vehicle air conditioner of claim 1, wherein
the expansion valve is controlled by the air-conditioning controller, and
the air-conditioning controller is configured to switch the operation modes of the heat pump device from the second heating operation mode into the defrosting operation mode by controlling the expansion valve in an opening direction.

5. The vehicle air conditioner of claim 1, wherein
the air conditioning controller detects frosting based on the temperature of the refrigerant at the refrigerant inlet of the exterior heat exchanger.

6. The vehicle air conditioner of claim 1, wherein
the air-conditioning controller is configured to, after switching the operation modes of the heat pump device from the first heating operation mode into the second heating operation mode, set a discharge rate per unit time of the refrigerant from the compressor to be higher than its setting before the switch of the operation modes.

7. The vehicle air conditioner of claim 1, wherein
the air-conditioning controller is configured to, after switching the operation modes of the heat pump device from the first heating operation mode into the second heating operation mode, set the airflow rate of the blower to be lower than its setting before the switch of the operation modes.

8. The vehicle air conditioner of claim 1, comprising an electric heater to heat the air-conditioning air, wherein
the electric heater is controlled by the air-conditioning controller, and
the air-conditioning controller is configured to activate the electric heater if a required blowout air temperature is not reached yet even after the operation modes of the heat pump device have been switched from the first heating operation mode into the second heating operation mode.

9. The vehicle air conditioner of claim 1, wherein
the air-conditioning controller is configured to, after switching the operation modes of the heat pump device from the first heating operation mode into the second heating operation mode, set a discharge rate per unit time of the refrigerant from the compressor to be higher than its setting before the switch of the operation modes.

10. The vehicle air conditioner of claim 1, wherein
the air-conditioning controller is configured to switch the operation modes of the heat pump device into the first heating operation mode after defrosting is finished in the defrosting operation mode.

11. The vehicle air conditioner of claim 1, wherein
the air-conditioning controller is configured to switch the operation modes of the heat pump device into the second heating operation mode and then into the first heating operation mode after defrosting is finished in the defrosting operation mode.

12. The vehicle air conditioner of claim 11, wherein
the air-conditioning controller is configured to switch the operation modes of the heat pump device from the second heating operation mode into the first heating operation mode after defrosting is finished when pressure of the refrigerant discharged from the compressor is equal to or higher than a predetermined pressure.

13. The vehicle air conditioner of claim 11, wherein
the air-conditioning controller is configured to switch the operation modes of the heat pump device from the second heating operation mode into the first heating operation mode after defrosting is finished when a blowout air temperature is equal to or higher than a predetermined temperature.

14. The vehicle air conditioner of claim 11, wherein
the air-conditioning controller is configured to switch the operation modes of the heat pump device into the first heating operation mode after defrosting is finished when a predetermined amount of time passes since the operation modes were switched into the second heating operation mode.

* * * * *